United States Patent
Dahlen

(10) Patent No.: US 11,527,337 B2
(45) Date of Patent: Dec. 13, 2022

(54) SILANE CROSSLINKABLE POLYMER COMPOSITION

(75) Inventor: Kristian Dahlen, Stora Höga (SE)

(73) Assignee: BOREALIS AG, Vienna (AT)

( * ) Notice: Subject to any disclaimer, the term of this patent is extended or adjusted under 35 U.S.C. 154(b) by 135 days.

(21) Appl. No.: 14/241,349

(22) PCT Filed: Aug. 24, 2012

(86) PCT No.: PCT/EP2012/066537
§ 371 (c)(1),
(2), (4) Date: May 29, 2014

(87) PCT Pub. No.: WO2013/030126
PCT Pub. Date: Mar. 7, 2013

(65) Prior Publication Data
US 2014/0329090 A1    Nov. 6, 2014

(30) Foreign Application Priority Data
Aug. 26, 2011 (EP) .................... 11178998

(51) Int. Cl.
| | | |
|---|---|---|
| *H01B 3/18* | (2006.01) | |
| *H01B 13/06* | (2006.01) | |
| *B05D 7/20* | (2006.01) | |
| *H01B 3/44* | (2006.01) | |
| *C08F 230/08* | (2006.01) | |
| *C08K 5/00* | (2006.01) | |
| *C08L 23/08* | (2006.01) | |
| *C08F 8/00* | (2006.01) | |
| *H01B 7/17* | (2006.01) | |

(52) U.S. Cl.
CPC ............... *H01B 3/441* (2013.01); *C08F 8/00* (2013.01); *C08F 230/08* (2013.01); *C08K 5/0091* (2013.01); *C08L 23/0892* (2013.01); *H01B 7/17* (2013.01); *H01B 13/06* (2013.01); *C08F 2810/20* (2013.01); *C08L 2203/202* (2013.01); *C08L 2312/08* (2013.01); *C08L 2314/08* (2013.01); *Y10T 428/2962* (2015.01)

(58) Field of Classification Search
CPC ........ C08F 210/02; C08F 230/08; C08F 8/00; C08F 2500/12; C08F 2810/20; C08K 5/0091; C08L 43/04; C08L 2203/202; C08L 2312/08; C08L 2314/08; C08L 23/0892; H01B 13/06; H01B 3/441; H01B 7/17; Y10T 428/2962
See application file for complete search history.

(56) References Cited

U.S. PATENT DOCUMENTS

| | | | | |
|---|---|---|---|---|
| 4,124,568 | A * | 11/1978 | Zecher ............... | C08G 18/6755 428/375 |
| 4,297,310 | A | 10/1981 | Akutsu et al. | |
| 4,316,875 | A * | 2/1982 | Barth .................... | B29B 7/7433 261/DIG. 26 |
| 4,351,876 | A | 9/1982 | Doi et al. | |
| 4,397,981 | A | 8/1983 | Doi et al. | |
| 4,413,066 | A | 11/1983 | Isaka et al. | |
| 4,446,283 | A | 5/1984 | Doi et al. | |
| 4,456,704 | A | 6/1984 | Fukumura et al. | |
| 2006/0100385 | A1* | 5/2006 | Walia ........................ | C08F 8/42 525/242 |
| 2010/0160471 | A1 | 6/2010 | Sengupta et al. | |
| 2010/0160571 | A1* | 6/2010 | Alric ................... | C08F 230/085 525/379 |
| 2011/0144278 | A1* | 6/2011 | Weissenbach ........ | C08F 230/08 525/288 |
| 2013/0220666 | A1* | 8/2013 | Fagrell ............. | C09D 123/0884 174/120 SC |

FOREIGN PATENT DOCUMENTS

| | | |
|---|---|---|
| CA | 50288 A | 10/1895 |
| EP | 0517868 A1 | 12/1992 |
| EP | 1004628 A1 | 5/2000 |
| EP | 1057861 A2 | 12/2000 |
| EP | 1650257 A1 | 4/2006 |
| GB | 1377737 A | 12/1974 |
| WO | 2004/072135 A1 | 8/2004 |
| WO | 2007032885 A2 | 3/2007 |
| WO | 2010000477 A1 | 1/2010 |

OTHER PUBLICATIONS

International Search Report and Written Opinion dated Apr. 26, 2013 (PCT/EP2012/066537); ISA/EP.
IPRP Chapter II dated Nov. 12, 2013 (PCT/EP2012/066537); ISA/EP.

* cited by examiner

*Primary Examiner* — Holly Rickman
*Assistant Examiner* — Linda N Chau
(74) *Attorney, Agent, or Firm* — Banner & Witcoff, Ltd.

(57) ABSTRACT

The invention relates to a crosslinkable polymer composition comprising (a) a polyolefin bearing hydrolysable silane groups and a silanol condensation catalyst compound, as well as to an article, preferably a cable, thereof. Also the use of the silanol condensation catalyst compound for crosslinking an article, preferably a layer of a cable is provided.

8 Claims, No Drawings

SILANE CROSSLINKABLE POLYMER COMPOSITION

CROSS-REFERENCE TO RELATED APPLICATIONS

The present application is a U.S. National Phase filing of International Application No. PCT/EP2012/066537, filed on Aug. 24, 2012, designating the United States of America and claiming priority to European Patent Application No.11178998.8, filed Aug. 26, 2011, and this application claims priority to and the benefit of the above-identified applications, which are both incorporated by reference herein in their entireties.

The present invention relates to a polymer composition comprising a polyolefin bearing hydrolysable silane groups and a silanol condensation catalyst, to a use of the composition for producing an article, preferably a cable, to a preparation process of an article, preferably a cable, comprising said polymer composition, the process including the silane-crosslinking step of the article, preferably the cable, to an article, preferably a cable, comprising said composition and to a silane-crosslinked article, preferably to a silane-crosslinked cable, comprising said polymer composition which is silane-crosslinked.

In wire and cable (W&C) applications a typical cable comprises a conductor surrounded by one or more layers of polymeric materials. The cables are commonly produced by extruding the layers on a conductor. One or more of said layers are often crosslinked to improve i.a. deformation resistance at elevated temperatures, as well as mechanical strength and/or chemical resistance, of the layer(s) of the cable.

Crosslinking of the polymers can be effected e.g. by free radical reaction using irradiation or using a crosslinking agent which is a free radical generating agent; or via hydrolysable silane groups present in the polymer using a condensation catalyst in the presence of water.

Power cable is defined to be a cable transferring energy operating at any voltage level. The voltage applied to the power cable can be alternating (AC), direct (DC) or transient (impulse). Moreover, power cables are typically indicated according to their level of operating voltage, e.g. a low voltage (LV), a medium voltage (MV), a high voltage (HV) or an extra high voltage (EHV) power cable, which terms are well known. Power cable is defined to be a cable transferring energy operating at any voltage level, typically operating at voltage higher than 100 V. LV power cable typically operates at voltages of below 3 kV. MV and HV power cables operate at higher voltage levels and in different applications than LV cables. A typical MV power cable, usually operates at voltages from 3 to 36 kV, and a typical HV power cable at voltages higher than 36 kV. EHV power cable operates at voltages which are even higher than typically used for HV power cable applications. LV power cable and in some embodiment medium voltage (MV) power cables usually comprise an electric conductor which is coated with an insulation layer. Typically MV and HV power cables comprise a conductor surrounded at least by an inner semiconductive layer, an insulation layer and an outer semiconductive layer, in that order.

Silane cured materials are used today primarily as insulation layer in low voltage cables and as insulation and semiconductive layer in medium and to some extent also for high voltage cables.

In case the polymer composition is crosslinkable via hydrolysable silane groups, then the hydrolysable silane groups may be introduced into the polymer by copolymerisation of a monomer, e.g. an olefin, together with a silane group containing comonomer or by grafting silane groups containing compound to a polymer. Grafting is a chemical modification of the polymer by addition of silane groups containing compound usually in a radical reaction. Such silane groups containing comonomers and compounds are well known in the field and e.g. commercially available. The hydrolysable silane groups are typically then crosslinked by hydrolysis and subsequent condensation in the presence of a silanol condensation catalyst and $H_2O$ in a manner known in the art. Silane crosslinking techniques are known and described e.g. in U.S. Pat. Nos. 4,413,066, 4,297,310, 4,351,876, 4,397,981, 4,446,283 and 4,456,704.

For crosslinking of polyolefins containing hydrolysable silane groups, a silanol condensation catalyst must be used. Conventional catalysts are, for example, tin-, zinc-, iron-, lead- or cobalt-organic compounds such as dibutyl tin dilaurate (DBTDL). However, it is known that DBTDL has a negative impact on the natural environment when the crosslinked products, such as cables, are installed in the ground. Furthermore, is also a hazardous material to work with.

CA50288 describes Ti catalysts for curing epoxy functionalised polymers. GB1377737 describes grafting a polyolefin by UV radiation with silane compound. The grafted polyolefin is subsequently crosslinked with a metal carboxylate, titanium ester or titanium chelate. The catalyst used in the examples is dibutyltin laurate. No use in wire and cable (W&C) applications are mentioned. WO2007032885 describes tin catalysts for W&C crosslinking applications.

It is hence an object of the present invention to provide a further silanol condensation catalyst for a polymer composition comprising a polyolefin bearing hydrolysable silane groups, which avoids the drawbacks of DBTDL, i.e. which is more environmentally friendly and less hazardous to work with.

DESCRIPTION OF THE INVENTION

It has now surprisingly been found that the above objects can be achieved with a new type of silanol condensation catalyst which is highly advantageous for silane crosslinking a polymer composition and articles thereof, preferably a layer of a cable.

Accordingly, the present invention provides a polymer composition which comprises
(a) a polyolefin bearing hydrolysable silane groups and
(b) a silanol condensation catalyst compound of formula (I):

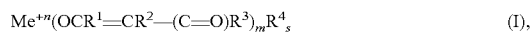

$$Me^{+n}(OCR^1=CR^2-(C=O)R^3)_m R^4_s \qquad (I),$$

wherein
Me is a metal selected from a group 2 to 14 of the Periodic Table of the Elements (according to IUPAC nomenclature of inorganic chemistry 1989);
n is an oxidation integer number 1 to 6; preferably 1 to 4;
m is an integer between 1 to 6; preferably 1 to 4;
s is an integer between 0 to 5; preferably 0 to 3;
wherein m+s=n which n is the above oxidation integer number 1 to 6; preferably 1 to 4;
each $R^1$ independently is H; a substituted or unsubstituted saturated or partially unsaturated hydrocarbyl group which optionally contains one or more heteroatom(s); a substituted or unsubstituted aromatic hydrocarbyl group which optionally contains one or more heteroatom(s); or a functional group;
each $R^2$ independently is H; a substituted or unsubstituted saturated or partially unsaturated hydrocarbyl group which optionally contains one or more heteroatom(s); a substituted or unsubstituted aromatic hydrocarbyl group which optionally contains one or more heteroatom(s); or a functional group;

each $R^3$ independently is H; a substituted or unsubstituted saturated or partially unsaturated hydrocarbyl group which optionally contains one or more heteroatom(s); a substituted or unsubstituted aromatic hydrocarbyl group which optionally contains one or more heteroatom(s); or a functional group;

or any two of $R^1$, $R^2$ and $R^3$ form together with the atom they are attached to a ring system; and each $R^4$ independently is a substituted or unsubstituted saturated or partially unsaturated hydrocarbyl group which optionally contains one or more heteroatom(s); a substituted or unsubstituted aromatic hydrocarbyl group which optionally contains one or more heteroatom(s); a group hydrolysable to a Brönsted acid; =O; or a halogen atom.

The silanol condensation catalyst compound of formula (I) (b) is more environmental frendly catalyst compared e.g. to tin based catalysts. The compound of formula (I) has also unexpectedly good crosslinking efficiency, expressed e.g. as hot set properties or gel content as defined below under Determination methods. The silanol condensation catalyst compound of formula (I) (b) can surprisingly be used as crosslinking catalyst in industrially suitable amounts for producing crosslinked articles, preferably cable layers with demanding mechanical properties required for a power cable. The crosslinked polymer composition of the invention has also good electrical properties needed in W&C field.

The polymer composition of the invention as defined above or below is referred herein also shortly as "polymer composition". As to the components of the polymer composition, the polyolefin bearing hydrolysable silane groups (a) is referred herein also shortly as "polyolefin (a)" and the silanol condensation catalyst compound of formula (I) (b) is referred herein also shortly as "catalyst (b)", "compound of formula (I)" or "compound (I)".

Moreover, the catalyst (b) can be present in the polymer composition before or after the formation of the shaped article, preferably a cable layer.

The preferred article is a cable. The term "cable" means cables and wires.

The preferred cable comprises a conductor surrounded by at least one layer which is selected from an insulation layer, a semiconductive layer or a jacketing layer.

More preferably, said at least one layer is an insulation layer.

Even more preferred cable is a power cable comprising a conductor surrounded at least by an inner semiconductive layer, an insulating layer and an outer semiconductive layer, wherein at least one layer, preferably at least the insulation layer or at least one of the inner and outer semiconductive layer, preferably at least the insulation layer, comprises, preferably consists of, the polymer composition which comprises (a) a polyolefin bearing hydrolysable silane groups and
(b) a silanol condensation catalyst compound, wherein the silanol condensation catalyst (b) is the compound of formula (I) as defined above, below or in claims.

Naturally, the polymer composition may comprise two or more catalysts (b).

The article, which is preferably the cable, is crosslinkable and is subsequently crosslinked before the end use. "Crosslinkable" means that the polymer composition can be silane-crosslinked using the catalyst (b) before the article, preferably the cable, is used in the end application thereof.

The invention further provides a use of a compound of formula (I) as defined above or below for crosslinking a polyolefin (a) as defined above or below, more preferably for crosslinking an article, preferably at least one layer of a cable, comprising said polyolefin (a).

Also an article, preferably a cable, comprising said polymer composition, as well as the production process thereof, is provided. Preferably the article, preferably at least one layer of the preferable cable, comprising the polymer composition is silane-crosslinked.

The following preferable embodiments, properties and subgroups of the polyolefin (a) and the compound of formula (I), of the polymer composition and of the article, preferably cable, are independently generalisable so that they can be used in any order or combination to further define the preferable embodiments of the polymer composition and the article, preferably the cable, of the invention. Moreover, unless otherwise stated, it is evident that the given polyolefin (a) descriptions apply to the polyolefin prior optional crosslinking Silanol Condensation Catalyst Compound of Formula (I) (b) (=Compound of Formula (I))

Catalyst (b) is an organic compound as defined above, below or in claims which catalyses the crosslinking of silane groups via hydrolysis and subsequent condensation reaction in the presence of said catalyst (b).

Without limiting to any theory the —OCR$^1$=CR$^2$—(C=O)R$^3$ group of the compounds (I) is believed to be a conjugated double bond system, whereby the covalent bond can be delocalised, i.e.

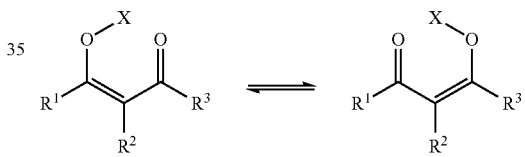

In the compounds (I), a hydrocarbyl group can be linear, branched or cyclic or a mixture of cyclic and linear or branched groups. For the avoidance of doubt, the term "hydrocarbyl" used herein does not mean aromatic cyclic groups as is clear from the definitions used herein, i.e. aromatic cyclic groups are defined as aromatic hydrocarbyl. The expression "partially unsaturated" means that the moiety may comprise one or more double or triple bonds and includes alkenyl radicals comprising at least one double bond and alkynyl radicals comprising at least one triple bond. In case of "partially unsaturated cyclic hydrocarbyl" there can be one or more double bonds in the ring systems meaning that the ring is non-aromatic to differentiate said "partially unsaturated" ring moieties from "aromatic rings" such as phenyl or pyridyl radicals.

The expression "monocyclic" includes monocyclic ring systems, such as cyclopentyl, cyclohexyl, cycloheptyl or phenyl. The expression "multicyclic" means herein fused ring systems, including the bicyclic rings, such as naphthyl.

The term "optional" in compound (I) means "may or may not be present", e.g. "optionally substituted" covers the possibilities that a substituent is present or is not present. The term "unsubstituted" naturally means that no substituent is present.

Each of the below preferable subgroups of the substituents are generalisable and can be combined in any combination in the compounds of formula (I):

Furthermore, the optional "heteroatom(s)" which may be present in any of the substituents, as moieties in the substituents or in the ring system formed by two substituents in the above formula (I) as defined above or below are independently selected from N, O, P or S, preferably N, O or S, more preferably N or O, most preferably from O. N, P or S can be present as oxides, such as $SO_2$. The position of the heteroatom(s) is not limited. Said hydrocarbyl substituent which contains heteroatom(s) may for instance be linked to the backbone of the compound (I) via a heteroatom, or such hydrocarbyl substituent may be interrupted by one or more heteroatom(s). For instance N or O, preferably O, if present in the hydrocarbyl substituent, can interrupt the hydrocarbyl moiety of the compound (I) (e.g. be present as —NX—, wherein X denotes H or a hydrocarbyl group as defined above or below, or as —O—), or the hydrocarbyl substituent is linked to the backbone of the compound (I) via the N or O atom, preferably via O atom, i.e. the hydrocarbyl substituent is —N=Z, —NH—Z, —N(Z)$_2$, or —O—Z; wherein each Z moiety denotes independently the rest of said hydrocarbyl substituent other than H (which may further contain a heteroatom(s), such as O, interrupting the hydrocarbyl group). It is noted herein that the hydrocarbyl containing one or more heteroatoms are often named in organic chemistry (e.g. as in well known IUPAC nomenclature system) according to their functionality, e.g. the above N and O containing hydrocarbyls are defined as amines or imines (herein containing at least one hydrocarbyl moiety) and, respectively, ethers or e.g. alkoxy or alkylalkoxy groups). However, herein the heteroatoms interrupting the hydrocarbyl substituent or linking the hydrocarbyl substituent to the backbone compound are included on purpose under the meaning of "hydrocarbyl group" to emphasize that there must be at least one hydrocarbyl moiety present in such hydrocarbyl substituents of compound (I).

When present, the optionally substituted saturated or partially unsaturated hydrocarbyl group, which optionally contains one or more heteroatoms, as defined above or below as $R^1$, $R^2$, $R^3$ or $R^4$ substituent of the compounds (I), is more preferably
(i) an optionally substituted linear or branched, saturated or partially unsaturated hydrocarbyl group;
(ii) an optionally substituted linear or branched, saturated or partially unsaturated hydrocarbyl group which bears a saturated or partially unsaturated cyclic hydrocarbyl moiety or an optionally substituted linear or branched, saturated or partially unsaturated hydrocarbyl group which bears an aromatic hydrocarbyl moiety; preferably an optionally substituted linear or branched, saturated or partially unsaturated hydrocarbyl group which bears a saturated or partially unsaturated cyclic hydrocarbyl moiety; or
(iii) an optionally substituted saturated or partially unsaturated cyclic hydrocarbyl group. Preferably, when present, the above ring system (iii) or the saturated or partially unsaturated cyclic hydrocarbyl moiety in the above hydrocarbyl (ii) contains from 5 to 15 ring atoms, and more preferably is saturated or partially unsaturated mono or multicyclic hydrocarbyl ring system which has 5 to 12 carbon atoms and which may contain one or more heteroatoms as defined above, more preferably an optionally substituted saturated or partially unsaturated mono or multicyclic hydrocarbyl ring system with 5 to 12 ring atoms, even more preferably a saturated or partially unsaturated monocyclic hydrocarbyl ring with 5 to 7 ring atoms which may contain heteroatoms.

Each of the above options (i), (ii) and (iii) as optionally substituted saturated or partially unsaturated hydrocarbyl group may independently contain one or more hetero atoms as defied above, preferably one or two, which is/are preferably independently selected from O or N, preferably O atom.

When present, the optionally substituted aromatic hydrocarbyl group as defined above as $R^1$, $R^2$, $R^3$ or $R^4$ substituent or as aromatic hydrocarbyl moiety in the above hydrocarbyl (ii) of the compounds (I), is more preferably a mono or multicyclic aryl which has 6 to 12 ring atoms and which may contain one or more heteroatoms as defined above, more preferably a mono or multicyclic aryl with carbon ring atoms, more preferably a phenyl moiety. The aromatic hydrocarbyl group may optionally bear one or more substituents and if present, then preferably bears a functional group as defined below or an optionally substituted linear or branched, saturated or partially unsaturated hydrocarbyl group (i) as defined above.

When in compound (I) any two of $R^1$, $R^2$ and $R^3$ together with the atom they are attached to form a substituted or unsubstituted ring system as defined above, then the ring system is preferably saturated, partially unsaturated or aromatic ring, which is optionally fused with one or more other rings, wherein said ring and the optional fused ring system optionally contains further heteroatom(s) and may optionally be substituted. Preferably such ring system contains from 5 to 15 ring atoms, more preferably is substituted or unsubstituted, saturated, partially unsaturated or aromatic mono or multicyclic ring system which has 5 to 12 ring atoms, preferably with 5 to 10 ring atoms, more preferably substituted or unsubstituted, saturated, partially unsaturated or aromatic monocyclic ring system with 5 to 7 ring atoms which is optionally fused with another ring system, and which may contain one or more heteroatoms as defined above or below.

Furthermore, when any of the "optionally substituted" linear or branched, saturated or partially unsaturated hydrocarbyl group (i), any of the "optionally substituted" saturated or partially unsaturated cyclic hydrocarbyl group as a substituent according to hydrocarbyl option (iii) or as a moiety in a hydrocarbyl substituent according to hydrocarbyl option (ii); any of the "optionally substituted" aromatic hydrocarbyl as a substituent or as a moiety in the hydrocarbyl option (ii); or any of the "optionally substituted" ring system formed by any two of $R^1$, $R^2$ or $R^3$, of compounds I, including the preferred subgroups thereof, as defined above or below, is substituted, then the "optional substituent(s)" are preferably selected from a "functional group", which is well known expression and means a pendant group, for instance a substituent linked to a phenyl ring. The number of the optional functional group(s) is preferably 1 to 4, preferably 1 to 3, more preferably from 1 or 2. It is preferred that the optional functional group(s) are independently selected from any of the following groups —OH, —NH$_2$, =NH, nitro, thiol, thioC$_{1-12}$alkyl, CN or halogen, such as —F, —Cl, —Br or —I, —COR', —CONR'$_2$, —COOR', wherein each R' is independently H or (C1-C12)alkyl.

Moreover, the saturated or partially unsaturated cyclic hydrocarbyl group as a substituent according to hydrocarbyl option (iii) or as a moiety in a hydrocarbyl substituent according to hydrocarbyl option (ii); the aromatic hydrocarbyl as a substituent or as a moiety in the hydrocarbyl option (ii); or the ring system formed by any two of $R^1$, $R^2$ or $R^3$, of the compounds (I), including the below preferable subgroups thereof, as defined above or below, may, additionally or alternatively to a functional group as the "optional" substituent, bear an optionally substituted linear or branched, saturated or partially unsaturated hydrocarbyl group (i) as defined above or below as said "optional"

substituent, which is more preferably a linear or branched (C1-C20)alkyl group, more preferably a linear or branched (C1-C12)alkyl group, more preferably a linear or branched (C1-C6)alkyl group; or any mixtures of said functional and hydrocarbyl groups.

It is noted that the "functional group" as the "optional" substituent is other than any "hetero atom containing hydrocarbyl" substituent of the compound (I).

The compounds (I) as the catalyst compound (b) are available as a commercial product or can be produced according to or analogously to a processes documented in the chemical literature.

More preferably, a preferable subgroup of compounds (I) of formula $Me^{+b}(OCR^1=CR^2—(C=O)R^3)_m R^4_s$ (I), as defined above, are referred herein as the compounds of formula (Ia), which are compounds of formula (I), wherein:

Me is a metal selected from a group 3 to 14, preferably from period 3 to 6, preferably from period 4 or 5, of a group 4 to 14, preferably of a group 4 to 12, of the Periodic Table of the Elements (according to IUPAC nomenclature of inorganic chemistry 1989);

n is an integer 2 to 4, preferably 2 or 4;

m is 1 to 3, preferably 1 or 2, more preferably 2;

s is an integer 0 to 3, preferably 0, 1 or 2, more preferably 0 or 2; m+s=n;

each $R^1$ independently is H; a substituted or unsubstituted saturated or partially unsaturated hydrocarbyl group which optionally contains one or more heteroatom(s); or a substituted or unsubstituted aromatic hydrocarbyl group which optionally contains one or more heteroatom(s);

each $R^2$ independently is H; a substituted or unsubstituted saturated or partially unsaturated hydrocarbyl group which optionally contains one or more heteroatom(s); or a substituted or unsubstituted aromatic hydrocarbyl group which optionally contains one or more heteroatom(s);

each $R^3$ independently is H; a substituted or unsubstituted saturated or partially unsaturated hydrocarbyl group which optionally contains one or more heteroatom(s); or a substituted or unsubstituted aromatic hydrocarbyl group which optionally contains one or more heteroatom(s); and each $R^4$ independently is a substituted or unsubstituted saturated or partially unsaturated hydrocarbyl group which optionally contains one or more heteroatom(s); a group hydrolysable to Brönsted acid; =O; or a halogen selected from F, Cl, Br or I.

More preferable subgroup of the above specific subgroup (Ia) of compounds (I) of formula $Me^{+n}(OCR^1=CR^2—(C=O)R^3)_m R^4_s$ (I), as defined above, are referred herein as the compounds of formula (Ib), which are compounds of formula (Ia), wherein:

Me is a metal selected from period 4 to 6, preferably period 4 or 5, more preferably period 4, of a group 3 to 12 of the Periodic Table of the Elements (according to IUPAC nomenclature of inorganic chemistry 1989);

n is an integer 2 to 4, preferably 2 or 4;

m is 1 to 3, preferably 1 or 2, more preferably 2;

s is an integer 0 to 3, preferably 0, 1 or 2, more preferably 0 or 2; m+s=n;

each $R^1$ independently is H; or

—$X_w$—$R^{1'}$, wherein X is a heteroatom as defined above, preferably N, O, P or S, more preferably N or O, even more preferably O; w is 0 or w is 1; and $R^{1'}$ is substituted or unsubstituted saturated or partially unsaturated hydrocarbyl group which optionally contains one or more heteroatom(s) as defined above, below or in claims, or a substituted or unsubstituted aromatic hydrocarbyl group which optionally contains one or more heteroatom(s) as defined above, below or in claims;

each $R^2$ independently is H; or

—$X_w$—$R^{1'}$, wherein X is a heteroatom as defined above, preferably N, O, P or S, more preferably N or O, even more preferably O; w is 0 or w is 1; and $R^{1'}$ is substituted or unsubstituted saturated or partially unsaturated hydrocarbyl group which optionally contains one or more heteroatom(s) as defined above, below or in claims, or a substituted or unsubstituted aromatic hydrocarbyl group which optionally contains one or more heteroatom(s) as defined above, below or in claims;

each $R^3$ independently is H; or

—$X_w$—$R^{1'}$R, wherein X is a heteroatom as defined above, preferably N, O, P or S, more preferably N or O, even more preferably O; w is 0 or w is 1; and $R^{1'}$ is substituted or unsubstituted saturated or partially unsaturated hydrocarbyl group which optionally contains one or more heteroatom(s) as defined above, below or in claims, or a substituted or unsubstituted aromatic hydrocarbyl group which optionally contains one or more heteroatom(s) as defined above, below or in claims; and each $R^4$ independently is —$X_w$—$R^{1'}$, wherein X is a heteroatom as defined above, preferably N, O, P or S, more preferably N or O, even more preferably O; w is 0 or w is 1; and $R^{1'}$ is substituted or unsubstituted saturated or partially unsaturated hydrocarbyl group which optionally contains one or more heteroatom(s) as defined above, below or in claims, or a substituted or unsubstituted aromatic hydrocarbyl group which optionally contains one or more heteroatom(s) as defined above, below or in claims;

a group hydrolysable to Brönsted acid which is selected from —Y—R2; Y is preferably —OC(=O)—, —C(=O)—O—C(=O)—, —$NR^5$C(=O)—, —OC(=O)$NR^5$—, —OC(=O)O—, —$NR^5$C(=O)OR—, —C(=O)NC(=O)—, —OS(=O)$_2$—, —OP(=O)$_2$—, —$NR^5$S(=O)$_2$—, —OS(=O)$_2NR^5$—, —SC(=O)—, —O$PR^6$(=O)O—, —OP(=O)(O$R^6$)O—, or —O$PR^6$(=O)OP(=O)(OR2)O—, wherein each $R^5$ independently is H or a linear hydrocarbyl group, preferably (C1-C8)alkyl group, more preferably $R^5$ is H; and each $R^6$ independently is H or R2 as defined below; and each R2 independently is substituted or unsubstituted saturated or partially unsaturated hydrocarbyl group which optionally contains one or more heteroatom(s) as defined above, below or in claims; or a substituted or unsubstituted aromatic hydrocarbyl group which optionally contains one or more heteroatom(s) as defined above, below or in claims;

=O;

or a halogen selected from Cl.

Substituted or unsubstituted saturated or partially unsaturated hydrocarbyl group which optionally contains one or more heteroatom(s) as R1 moiety of substituents $R^1$ to $R^3$ and as R1 or R2 moieties of substituent $R^2$ of compounds (I) including the preferable subgroups of compounds (Ia) and (Ib) thereof are each independently selected from an optionally substituted linear or branched hydrocarbyl group (i) as defined above; which is preferably an optionally substituted linear or branched (C1-C50) alkyl group, an optionally substituted linear or branched (C2-C50)alkenyl group or an optionally substituted linear or branched (C2-C30)alkynyl group; more preferably a linear or branched (C1-C50)alkyl group, preferably a linear or branched (C1-C30)alkyl group, more preferably a linear or branched (C1-C20) alkyl group;

from a linear or branched (C1-C20)alkyl(O—(C1-C20)alkyl)$_p$, (C1-C20)alkyl(O—(C1-C20)alkenyl)$_p$ or (C1-C20)alkyl-O(C1-C20)alkyl)$_e$(C1-C20)alkenyl)$_f$, wherein each p is independently 1, 2 or 3, each e is independently 0, 1 or 2 and each f is independently 0, 1 or 2; which is preferably a linear or branched (C1-C12)alkyl(O—(C1-C12)alkyl)$_p$ or (C1-C12)alkyl(O—(C1-C12)alkenyl)$_p$, wherein each p is independently 1 or 2; or from an optionally substituted mono or multicyclic aryl group which has 6 to 12 ring atoms and which may contain one or more heteroatoms as defined above, preferably said optionally substituted mono or multicyclic aryl group is an optionally substituted mono or multicyclic aryl group with carbon ring atoms, more preferably an optionally substituted phenyl group.

The aromatic hydrocarbyl group as said R1 or R2 is optionally, and preferably, substituted with 1 to 4, preferably 1 or 2, more preferably 1, substituent(s), which are each independently selected from an optionally substituted linear or branched, saturated or partially unsaturated hydrocarbyl group as defined above, preferably from a linear or branched (C1-C50) alkyl group, more preferably from a linear or branched (C1-C30) alkyl group, even more preferably a linear or branched (C1-C20)alkyl group.

Even more preferred subgroup of the above specific subgroup (Ib) of compounds (I) of formula Me$^{+n}$(OCR$^1$=CR$^2$—(C=O)R$^3$)$_m$R$^4{}_s$ (I), as defined above, are referred herein as the compounds of formula (Ic),

Me$^{+n}$(OCR$^1$αCH—C(C=O)R$^3$)$_m$R$^4{}_s$ (Ic), wherein Me is a metal selected from period 4 of a group 3 to 12 of the Periodic Table of the Elements (according to IUPAC nomenclature of inorganic chemistry 1989);

n is 2 or 4;

m is 2; s is 0 or 2; m+s=n;

each R$^1$ independently is —X$_w$—R$^{1'}$, wherein X is a heteroatom as defined above or below, preferably N, O, P or S, more preferably N or O, even more preferably O; w is 0 or 1, preferably 0; and R$^{1'}$ moiety is selected from a linear or branched (C1-C30)alkyl group, more preferably a linear or branched (C1-C20)alkyl group, more preferably from a linear or branched (C1-C12)alkyl group, more preferably from a linear or branched (C1-C6)alkyl group;

each R$^3$ independently is —X$_w$—R$^{1'}$, wherein X is a heteroatom as defined above or below, preferably N, O, P or S, more preferably N or O, even more preferably O; w is 0 or 1, preferably 0; and R$^{1'}$ moiety is selected from a linear or branched (C1-C30)alkyl group, more preferably a linear or branched (C1-C20)alkyl group, more preferably from a linear or branched (C1-C12)alkyl group, more preferably from a linear or branched (C1-C6)alkyl group; and each R$^4$ independently is selected from —X$_w$—R$^{1'}$, wherein X is a heteroatom as defined above or below, preferably N, O, P or S, more preferably N or O, even more preferably O; w is 0 or 1; and R1 moiety is selected from a linear or branched (C1-C30)alkyl group, more preferably a linear or branched (C1-C20)alkyl group, more preferably a linear or branched (C1-C12)alkyl group, more preferably a linear or branched (C1-C6) alkyl group; or from a linear or branched (C1-C20)alkyl(O—(C1-C20)alkyl)$_p$, (C1-C20)alkyl(O—(C1-C20)alkenyl)$_p$ or (C1-C20)alkyl-O(C1-C20)alkyl)$_e$(C1-C20)alkenyl)$_f$, wherein each p is independently 1, 2 or 3, each e is independently 0, 1 or 2 and each f is independently 0, 1 or 2; preferably a linear or branched (C1-C12)alkyl(O—(C1-C12)alkyl)$_p$ or (C1-C12)alkyl(O—(C1-C12)alkenyl)$_p$, more preferably a linear or branched (C1-C6)alkyl(O—(C1-C6)alkyl)$_p$ or (C1-C6)alkyl(O—(C1-C6)alkenyl)$_p$, wherein each p is independently 1 or 2;

more preferably R$^{1'}$ moiety is selected from a linear or branched (C1-C30)alkyl group, more preferably from a linear or branched (C1-C20)alkyl group, more preferably from a linear or branched (C1-C12)alkyl group, more preferably from a linear or branched (C1-C6)alkyl group;

a group hydrolysable to a Brönsted acid which is selected from —OC(=O)—R2, —OP(=O)$_2$—R2, —OPR$^6$(=O)OP(=O)(O—R2)$_2$ (wherein R$^6$ is as defined above, preferably H), —OP(=O)(OR$^6$)O—R2 (wherein R$^6$ is as defined above, preferably R2 as defined above or below) or —OS(=O)$_2$—R2; and R2 moiety is independently selected from a substituted or unsubstituted saturated or partially unsaturated hydrocarbyl group which optionally contains one or more heteroatom(s) as defined above, preferably from an optionally substituted linear or branched hydrocarbyl group; preferably from an optionally substituted linear or branched (C1-C50)alkyl group, an optionally substituted linear or branched (C2-C50)alkenyl group or an optionally substituted linear or branched (C2-C30)alkynyl group; more preferably from a linear or branched (C1-C50) alkyl group, even more preferably from a linear or branched (C1-C30)alkyl group, even more preferably from linear or branched (C1-C20) alkyl group; or from an optionally substituted mono or multicyclic aryl group which has 6 to 12 ring atoms and which may contain one or more heteroatoms as defined above, more preferably from an optionally substituted mono or multicyclic aryl group with carbon ring atoms, more preferably from an optionally substituted phenyl group or a naphthyl group, more preferably from a phenyl group, and wherein the aromatic hydrocarbyl group is preferably substituted with 1 to 4, preferably 1 or 2, more preferably 1, substituent(s), which are each independently selected from linear or branched, saturated or partially unsaturated hydrocarbyl group as defined above, preferably the optional substituent is selected from a linear or branched (C1-C50) alkyl groups, preferably from linear or branched (C1-C30)alkyl groups, more preferably from linear or branched (C1-C20)alkyl groups; or

=O.

The most preferred silanol condensation catalyst (b) of the invention is a further subgroup (Icc) of the subgroup compounds (Ic) of the formula Me$^{+n}$(OCR$^1$=CH—C(C=O)R$^3$)$_m$R$^4$ (Ic) of the compounds (I), which are compounds of the formula (Ic), wherein Me is selected from Ti, Zr, Hf, Cu or Zn, more preferably from Ti, Cu or Zn;

n, m and s are as defined above under compounds (Ic);

each R$^1$ is independently selected from —X$_w$—R$^{1'}$ group, wherein X is O or N, more preferably O; w is 0 or 1, preferably 0; R¹' moiety is selected from a linear or branched (C1-C30)alkyl group, more preferably from a linear or branched (C1-C20)alkyl group, more preferably from a linear or branched (C1-C12)alkyl group, even more preferably from a linear or branched (C1-C6)alkyl group;

each $R^3$ is independently selected from —$X_w$—R¹' group, wherein X is O or N, more preferably O; w is 0 or 1, preferably 0; R¹' moiety is selected from a linear or branched (C1-C30)alkyl group, more preferably from a linear or branched (C1-C20)alkyl group, more preferably from a linear or branched (C1-C12)alkyl group, more preferably from a linear or branched (C1-C6)alkyl group; and each $R^4$ is independently selected from —$X_w$—R¹', wherein X is O or N, more preferably O; w is 0 or 1, preferably w is 1; and R¹' moiety is selected from a linear or branched (C1-C30)alkyl group, more preferably from a linear or branched (C1-C20)alkyl group, more preferably from a linear or branched (C1-C12)alkyl group, more preferably a linear or branched (C1-C6)alkyl group; or from a linear or branched (C1-C20)alkyl(O—(C1-C20)alkyl)$_p$, (C1-C20)alkyl(O—(C1-C20)alkenyl)$_p$ or (C1-C20)alkyl-O(C1-C20)alkyl)$_e$(C1-C20)alkenyl)$_f$, wherein each p is independently 1, 2 or 3, each e is independently 0, 1 or 2 and each f is independently 0, 1 or 2; preferably from a linear or branched (C1-C12)alkyl(O—(C1-C12)alkyl)p or (C1-C12)alkyl(O—(C1-C12)alkenyl)p, wherein each p is independently 1 or 2;

R¹' is more preferably selected from a linear or branched (C1-C30)alkyl group, more preferably from a linear or branched (C1-C20)alkyl group, more preferably from a linear or branched (C1-C12)alkyl group, even more preferably from a linear or branched (C1-C6)alkyl.

Two or more $R^4$ substituents of the compounds (I), (Ia), (Ib), (Ic) or (Icc) as defined above or in claims can be identical or different. In case of two or more $R^4$ groups, these are most preferably identical.

Two or more (OCR¹=CR²—C(C=O)R³) moieties of the compounds (I), (Ia), (Ib), (Ic) or (Icc) as defined above or in claims can be identical or different. In case of two or more (OCR¹=CR²—C(C=O)R³) moieties, these are most preferably identical.

$R^1$ and $R^3$ substituents in a (OCR¹=CR²—C(C=O)R³) moiety of the compounds (I), (Ia), (Ib), (Ic) or (Icc) as defined above or in claims can be identical or different. It is preferred that $R^1$ and $R^3$ substituents are identical.

As a non-limiting example of compounds (Ic) as preferable compounds (I), the following compounds (Icc) can be mentioned:

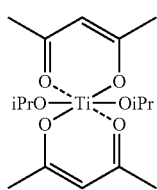

which is Titanium diisopropoxide bis(2,4-pentanedionate), CAS-nr: 17927-72-9, supplied by DuPont,

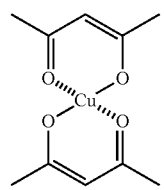

which is Copper(II) acetylacetonate, CAS-nr: 13395-16-9, supplied by Sigma-Aldrich, and

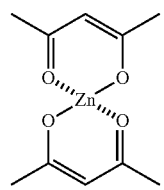

which is Zinc acetylacetonate, CAS-nr: 108503-47-5, supplied by Sigma-Aldrich.

Most preferable compounds (I) are compounds (Ic), more preferably (Icc), wherein the metal is Ti or Cu.

Suitable compounds (I) as the silanol catalyst compound (b) including the preferable subgroups thereof are as such well known and can be e.g. commercially available or can be prepared according to or analogously to known preparation methods described in the chemical literature.

Polyolefin Bearing Hydrolysable Silane Groups (a) (=Polyolefin (a))

Where herein it is referred to a "polymer", e.g. polyolefin, such as polyethylene, this is intended to mean both a homo- or copolymer, e.g. a homopolymer and copolymer of an olefin, such as a homopolymer and copolymer ethylene.

The hydrolysable silane groups may be introduced into the polyolefin of polyolefin (a) by copolymerisation of olefin, e.g. ethylene, monomer with at least silane group(s) containing comonomer(s) or by grafting a silane group(s) containing compound(s) to the polyolefin. Grafting is preferably effected by radical reaction, e.g. in the presence of a radical forming agent (such as peroxide). Both techniques are well known in the art.

Preferably, the polyolefin bearing hydrolysable silane groups (a) is a copolymer of olefin with a silane group(s) bearing comonomer and, optionally, with other comonomer(s); or is a homopolymer or copolymer of olefin with silane groups which are introduced by grafting a silane group(s) containing compound to the polyolefin polymer.

As well known "comonomer" refers to copolymerisable comonomer units.

The silane group(s) containing comonomer for copolymerising silane groups or the silane group(s) containing compound for grafting silane groups to produce polyolefin (a) is preferably an unsaturated silane compound/comonomer represented by the formula $$R^1SiR^2_qY_{3-q} \quad (II)$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

The hydrocarbyl moiety present in any substituent as $R^1$ of compound/comonomer (II) can be linear or branched hydrocarbyl or a cyclic hydrocarbyl.

More preferable subgroup of compounds/comonomers (II) are compounds/comonomers of formula (IIa), wherein $R^1$ is vinyl, allyl, isopropenyl, butenyl, cyclohexanyl or gamma-(meth)acryloxy alkyl; and Y is methoxy, ethoxy, formyloxy, acetoxy, propionyloxy or an alkyl- or arylamino group; and $R^2$, if present, is a methyl, ethyl, propyl, decyl or phenyl group, preferably $R^2$ is not present.

Even more preferable subgroup of silane compounds (II) are compounds/comonomers selected from compounds/comonomers of formula (IIc) or compounds/comonomers of formula (IId):

$$CH_2=CH-(CH_2)_t-Si(OA)_3 \quad (IIc),$$

wherein t=0 to 6, preferably 0 to 5, preferably 0 to 4, more preferably 0 to 3, preferably 0 to 2, more preferably 0 or 1, most preferably 0; and
A is a hydrocarbyl group, formyl group or acetyl group, preferably a hydrocarbyl group having 1-8 carbon atoms, preferably 1-4 carbon atoms; or

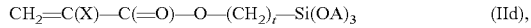

$$CH_2=C(X)-C(=O)-O-(CH_2)_s-Si(OA)_3 \quad (IId),$$

wherein s=1 to 6, preferably 1 to 5, more preferably 1 to 4, more preferably 1, 2 or 3, most preferably 3;
X is H or —$CH_3$, preferably —$CH_3$; and
A is a hydrocarbyl group, formyl group or acetyl group, preferably a hydrocarbyl group having 1 to 8 carbon atoms, preferably 1 to 4 carbon atoms.

As evident for a skilled person, the choice of the suitable unsaturated silane compound/comonomer depends i.a. on the desired crosslinking effect, e.g. desired crosslinking speed, which can be adjusted e.g. with the desired accessibility of the silane groups to the crosslinking catalyst. The accessibility in turn can be adjusted, as well known, e.g. by the length of the silane side chain protruding from the polymer backbone.

Most preferred compounds are compounds (IIc), preferably vinyl trimethoxysilane, vinyl bismethoxyethoxysilane or vinyl triethoxysilane.

Suitable silane group(s) containing comonomer for copolymerising silane groups or the silane group(s) containing compound for grafting silane groups to produce polyolefin (a) are as such well known and can be e.g. commercially available or can be prepared according to or analogously to known preparation methods described in the chemical literature.

A suitable polyolefin for the polyolefin bearing hydrolysable silane groups (a) can be any polyolefin, such as any conventional polyolefin, which can be used for producing an article, preferably a cable layer of a cable, of the present invention. For instance such suitable conventional polyolefins are as such well known and can be e.g. commercially available or can be prepared according to or analogously to known polymerization processes described in the chemical literature.

The polyolefin (a) for the polymer composition is preferably selected from a polypropylene (PP) or polyethylene (PE), preferably from a polyethylene, bearing hydrolysable silane groups.

In case a polyolefin (a) is a copolymer of ethylene with at least one comonomer other than silane group(s) containing comonomer (referred herein also shortly as "other comonomer") and wherein the silane group(s) are incorporated by grafting or copolymerizing with a silane group(s) containing compound/comonomer, then suitable such other comonomer is selected from non-polar comonomer(s) or polar comonomers, or any mixtures thereof. Preferable other non-polar comonomers and polar comonomers are described below in relation to polyethylene produced in a high pressure process.

Preferable polyolefin (a) is a polyethylene produced in the presence of an olefin polymerisation catalyst or a polyethylene produced in a high pressure process, which bears hydrolysable silane groups.

"Olefin polymerisation catalyst" means herein preferably a coordination catalyst. Such coordination catalyst has a well known meaning and is preferably selected from a Ziegler-Natta catalyst, single site catalyst which term comprises a metallocene and a non-metallocene catalyst, or a chromium catalyst, or any mixture thereof. The terms have a well known meaning.

Polyethylene polymerised in the presence of an olefin polymerisation catalyst is also often called as "low pressure polyethylene" to distinguish it clearly from polyethylene produced in a high pressure process. Both expressions are well known in the polyolefin field. Low pressure polyethylene can be produced in polymerisation process operating i.a. in bulk, slurry, solution, or gas phase conditions or in any combinations thereof. The olefin polymerisation catalyst is typically a coordination catalyst.

More preferably, the polyolefin (a) is selected from a homopolymer or a copolymer of ethylene produced in the presence of a coordination catalyst or produced in a high pressure polymerisation process, which bears hydrolysable silane groups.

In a first embodiment of the polyolefin (a) of the polymer composition of the invention, the polyolefin (a) is a low pressure polyethylene (PE) bearing the hydrolysable silane groups. Such low pressure PE is preferably selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein polyethylenes which are also known as plastomers and elastomers and covers the density range of from 850 to 909 kg/m³. The LLDPE has a density of from more than 909 to 930 kg/m³, preferably of from more than 909 to 929 kg/m³, more preferably of from 915 to 929 kg/m³. The MDPE has a density of from more than 929 to 945 kg/m³, preferably 930 to 945 kg/m³. The HDPE has a density of more than 945 kg/m³, preferably of more than 946 kg/m³, preferably form 946 to 977 kg/m³, more preferably form 946 to 965 kg/m³. More preferably such low pressure copolymer of ethylene for the polyolefin (a) is copolymerized with at least one comonomer selected from C3-20 alpha olefin, more preferably from C4-12 alpha-olefin, more preferably from C4-8 alpha-olefin, e.g. with 1-butene, 1-hexene or 1-octene, or a mixture thereof. The amount of comonomer(s) present in a PE copolymer is from 0.1 to 15 mol %, typically 0.25 to 10 mol-%.

Moreover, in case the polyolefin (a) is a low pressure PE polymer bearing the hydrolysable silane groups, then such PE can be unimodal or multimodal with respect to molecular weight distribution (MWD=Mw/Mn). Generally, a polymer comprising at least two polymer fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions.

"Polymer conditions" mean herein any of process parameters, feeds and catalyst system.

Unimodal low pressure PE can be produced by a single stage polymerisation in a single reactor in a well known and documented manner. The multimodal PE can be produced in one polymerisation reactor by altering the polymerisation conditions and optionally the catalyst, or, and preferably, in the multistage polymerisation process which is conducted in at least two cascaded polymerisation zones. Polymerisation zones may be connected in parallel, or preferably the polymerisation zones operate in cascaded mode. In the preferred multistage process a first polymerisation step is carried out in at least one slurry, e.g. loop, reactor and the second polymerisation step in one or more gas phase reactors. One preferable multistage process is described in EP517868. Preferably, the same catalyst is used in each polymerisation stage of a multistage process.

A LLDPE, MDPE or HDPE as defined above or below are preferable type of low pressure PE for polyolefin (a), more preferably a LLDPE copolymer as defined above or below. Such LLDPE can unimodal or multimodal.

The silane group(s) containing units can be incorporated to the low pressure polyethylene by grafting or by copolymerizing ethylene with a silane group(s) containing comonomer and optionally with other comonomer(s), which is preferably a non-polar comonomer. Preferable hydrolysable silane groups bearing low pressure PE as the polyolefin (a) is a HDPE homopolymer or copolymer, MDPE copolymer or a LLDPE copolymer, wherein the silane group(s) are incorporated by grafting a silane group(s) containing compound. The low pressure PE as the polyolefin bearing hydrolysable silane groups (a) has preferably an $MFR_2$ of up to 1200 g/10 min, such as of up to 1000 g/10 min, preferably of up to 500 g/10 min, preferably of up to 400 g/10 min, preferably of up to 300 g/10 min, preferably of up to 200 g/10 min, preferably of up to 150 g/10 min, preferably from 0.01 to 100, preferably from 0.01 to 50 g/10 min, preferably from 0.01 to 40.0 g/10 min, preferably of from 0.05 to 30.0 g/10 min, preferably of from 0.1 to 20.0 g/10 min, more preferably of from 0.2 to 15.0 g/10 min.

In a second embodiment of the polyolefin (a) of the invention, the polyolefin (a) is a polyethylene which is produced in a high pressure polymerisation (HP) and bears hydrolysable silane groups. In this embodiment the polyethylene is preferably produced in a high pressure polymerisation process in the presence of an initiator(s), more preferably is a low density polyethylene (LDPE), bearing hydrolysable silane groups. It is to be noted that a polyethylene produced in a high pressure (HP) process is referred herein generally as LDPE and which term has a well known meaning in the polymer field. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

The preferred embodiment is the second embodiment, where the polyolefin (a) is a polyethylene which is produced in a high pressure polymerisation (HP) process and bears hydrolysable silane groups. In this preferable second embodiment, such hydrolysable silane groups bearing LDPE polymer as polyolefin (a) may be a low density homopolymer of ethylene (referred herein as LDPE homopolymer) or a low density copolymer of ethylene with at least one other comonomer (referred herein as LDPE copolymer), wherein the hydrolysable silane group(s) containing compound is incorporated to said LDPE polymer by grafting or a low density copolymer of ethylene with at least the silane group(s) containing comonomer, which is preferably as defined above, and optionally with one or more other comonomer (referred herein as LDPE copolymer). The one or more other comonomer(s) of LDPE copolymer are preferably selected from polar comonomer(s), non-polar comonomer(s) or from a mixture of polar comonomer(s) and non-polar comonomer(s), as defined above or below. Moreover, said LDPE homopolymer or LDPE copolymer as said polyolefin (a) may optionally be unsaturated.

As a polar comonomer, if present, for the LDPE copolymer bearing hydrolysable silane groups as the preferred polyolefin (a), a polar comonomer is preferably selected from a comonomer containing hydroxyl group(s), alkoxy group(s), carbonyl group(s), carboxyl group(s), ether group(s) or ester group(s), or a mixture thereof. Moreover, comonomer(s) containing carboxyl and/or ester group(s) are more preferable as said polar comonomer. Still more preferably, the polar comonomer(s), if present, of hydrolysable silane groups bearing LDPE copolymer is selected from the groups of acrylate(s), methacrylate(s) or acetate(s), or any mixtures thereof. If present in said hydrolysable silane groups bearing LDPE copolymer, the polar comonomer(s) is preferably selected from the group of alkyl acrylates, alkyl methacrylates or vinyl acetate, or a mixture thereof, more preferably from $C_1$- to $C_6$-alkyl acrylates, $C_1$- to $C_6$-alkyl methacrylates or vinyl acetate. Still more preferably, if polar comonomer(s) are present, then the hydrolysable silane groups bearing LDPE copolymer is a copolymer of ethylene with $C_1$- to $C_4$-alkyl acrylate, such as methyl, ethyl, propyl or butyl acrylate, or vinyl acetate, or any mixture thereof, which bears hydrolysable silane groups.

As the non-polar comonomer(s), if present, for the LDPE copolymer bearing hydrolysable silane groups as the preferred polyolefin (a), comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond, such as diene) comonomer(s); or any mixtures thereof.

If the LDPE polymer bearing hydrolysable silane groups as the preferred polyolefin (a) is a copolymer of ethylene with other comonomer(s), then the amount of the other comonomer(s) present in said LDPE polymer is preferably from 0.001 to 50 wt.-%, more preferably from 0.05 to 40 wt.-%, still more preferably less than 35 wt.-%, still more preferably less than 30 wt.-%, more preferably less than 25 wt.-%.

As already mentioned, the silane group(s) can be incorporated to the high pressure polyethylene, preferably to the LDPE polymer, as the preferred polyolefin (a) by grafting or by copolymerizing ethylene with a silane group(s) containing comonomer and optionally with other comonomer(s). In this preferred second embodiment the polyolefin (a) is a HP polyethylene bearing hydrolysable silane groups, and is most preferably a LDPE copolymer of ethylene with a silane group containing comonomer as defined above or below and optionally with other comonomer(s).

Typically, and preferably in wire and cable (W&C) applications, the density of the LDPE polymer bearing hydrolysable silane groups as the polyolefin (a), is higher than 860 kg/m³. Preferably the density of such LDPE polymer, is not higher than 960 kg/m³, and preferably is from 900 to 945 kg/m³. The MFR₂ (2.16 kg, 190° C.) of the LDPE polymer bearing hydrolysable silane groups as the polyolefin (a), is preferably from 0.01 to 50 g/10 min, more preferably from 0.01 to 40.0 g/10, more preferably is from 0.1 to 20 g/10 min, and most preferably is from 0.2 to 10 g/10 min.

Accordingly, the LDPE polymer for the polyolefin (a) is preferably produced at high pressure by free radical initiated polymerisation (referred to as high pressure (HP) radical polymerization). The HP reactor can be e.g. a well known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

The polyolefin bearing hydrolysable silane groups (a) is most preferably selected from a homopolymer or copolymer of ethylene produced in a low pressure polymerisation process in the presence of a coordination catalyst, as defined above, and grafted with a silane group bearing compound, as defined above, or from a copolymer of ethylene produced in a high pressure polymerisation process, as defined above or below, by copolymerising ethylene with at least one silane group(s) bearing comonomer, as defined above or below, and, optionally, with one or more other comonomer(s). More preferably, the polyolefin bearing hydrolysable silane groups (a) has been obtained by copolymerisation of ethylene in a high pressure process with at least silane group bearing comonomer as defined above, and, optionally, with one or more other comonomer(s).

the Polymer Composition (=Polymer Composition of the Invention)

The polymer composition preferably comprises the silanol condensation catalyst compound of formula (I) in an amount of 0.0001 wt % or more, preferably up to 6.0 wt %, preferably 0.01 to 2.0 wt %, more preferably 0.02 to 0.5 wt %, based on the combined amount of the polyolefin (a) and silanol condensation catalyst compound of formula (I).

The polymer composition preferably comprises the polyolefin (a) in an amount of 99.9999 wt % or less, preferably at least 94.0 wt % or more, preferably of 99.99 to 98.0 wt %, more preferably of 99.98 to 99.5 wt %, based on the combined weight of the polyolefin (a) and the silanol condensation catalyst compound of formula (I).

Preferably, the polymer composition comprises hydrolysable silane group(s) in an amount of from 0.001 to 12 mol %, preferably of from 0.01 to 4 mol %, most preferably of from 0.05 to 1.6 mol %, based on the total amount (weight) of the polymer composition. More preferably the mol % amount (calculated from the wt % as determined below under "Determination methods") of the hydrolysable silane group(s) is based on the total amount of the polyolefin (a) component.

"Silane group" means herein the hydrolysable silane moiety. Preferable silane-moiety is $(Y)_{3-q}$Si-moiety as defined above in formula (II) which is crosslinkable by hydrolysation and subsequent condensation reaction in the presence of a silanol condensation catalyst and water, as known in the art, to form Si—O—Si links between other hydrolysable silane-groups present in said polyolefin (a) component. Preferred hydrolysable silane-group is a hydrolysable (AO)₃Si-moiety as defined above in formula (IIc) or (IId).

The polymer composition may contain further components, such as further polymer component(s), like miscible thermoplastic(s), additive(s), such as antioxidant(s), further stabilizer(s), e.g. water treeing retardant(s), scorch retardant(s); lubricant(s), foaming agent(s), filler(s), such as carbon black; or colorant(s).

The total amount of further polymer component(s), if present, is typically up to 60 wt %, preferably up 50 wt %, preferably up 40 wt %, more preferably from 0.5 to 30 wt %, preferably from 0.5 to 25 wt %, more preferably from 1.0 to 20 wt %, based on the total amount of the polymer composition.

The total amount of additive(s), if present, is generally from 0.01 to 10 wt %, preferably from 0.05 to 7 wt %, more preferably from 0.2 to 5 wt %, based on the total amount of the polymer composition.

The polymer composition may, and preferably, comprises antioxidant(s). Preferably, the antioxidant is present in the composition in an amount of from 0.01 to 3 wt %, more preferably 0.05 to 2 wt %, and most preferably 0.08 to 1.5 wt %, based on the total amount of the polymer composition.

The polymer composition may comprise a filler(s), e.g. a conductive filler, such as a conductive carbon black, if used as semiconductive compositions; or a flame retardant filler(s), such as magnesium or aluminium hydroxide, if used as flame retardant composition; or a UV protecting filler(s), such as UV-carbon black or UV stabiliser, if used as UV-stabilised composition; or any combination(s) thereof. The amount of the filler in general depends on the nature of the filler and the desired end application, as evident for a skilled person. E.g. when the polymer composition comprises conductive filler, then the amount thereof is of up to 65 wt %, preferably from 5 to 50 wt %, based on the total amount of the polymer composition.

The polymer composition may comprise a colorant which is then typically added to the composition in form of a color master batch. Such color master batches may be commercially available or may be prepared in a conventional manner by combining the colorant with a carrier medium. The amount of colorant master batch, if present, is preferably up to 5 wt %, more preferably from 0.1 to 3 wt %, based on the total amount of the polymer composition.

The catalyst (b) can be added to polyolefin (a) as neat (i.e. as provided by the supplier) or in a master batch (MB). In case of the MB the carrier medium can be liquid or solid, for instance a carrier polymer.

The amount of polyolefin (a) in the polymer composition of the invention is typically of at least 35 wt %, preferably of at least 40 wt %, preferably of at least 50 wt %, preferably of at least 75 wt %, more preferably of from 80 to 100 wt % and more preferably of from 85 to 100 wt %, based on the total amount of the polymer component(s) present in the polymer composition. The preferred polymer composition consists of polyolefin (a) as the only polymer components. The expression means that the polymer composition does not contain further polymer components, but the polyolefin (a) as the sole polymer component. However, it is to be understood herein that the polymer composition may comprise further component(s) other than the polyolefin (a) component, such as additive(s) which may optionally be added in a mixture with a carrier polymer in so called master batch. Also the catalyst (b) can be added in form of a master batch, wherein the carrier medium is a polymer. In such cases the carrier polymer of the master batch is not calculated to the amount of the polymer components, but to the total amount of the polymer composition.

The polymer composition of the invention can be produced before or after producing an article which is preferably a cable.

In a first embodiment for producing the polymer composition, the polyolefin (a) and the catalyst (b) are combined together before formation of an article which is preferably at least one layer of a cabler. The catalyst (b) can be added as such, i.e. as a neat catalyst (b) or in form of the MB, to the polyolefin (a). The components are preferably combined together by compounding in a conventional manner, e.g. by extruding the components with a screw extruder or a kneader. The obtained meltmixture is preferably pelletised and the pellets of the polymer composition, which can be of any size and shape, are used in the article, preferably in the cable, production process. Alternatively, in this first embodiment for producing the polymer composition the preparation of the polymer composition or an addition of part of the other component(s) thereof, such as the catalyst (b) or additive(s), or any mixture thereof, can be carried out during the article, preferably during the cable, production process, e.g. in a cable production line, e.g. in a mixer preceding the cable extruder or in the cable extruder, or in both. The obtained mixture is used to form an article, preferably at least one cable layer.

In a second embodiment, the catalyst (b) is combined together with the polyolefin (a) after the formation of an article, preferably a cable, from the polyolefin (a). For instance the catalyst (b) can migrate to a cable layer(s) of polyolefin (a) from another layer adjacent to said layer and thus the polymer composition is formed after the layer production and e.g. before or during the crosslinking of the layer(s).

The first or second embodiment for producing the polymer composition can be chosen depending on the desired article, preferably the desired cable application of the polymer composition.

End Use of the Polymer Composition

The invention also provides an article comprising a polymer composition which comprises a polyolefin (a) and a catalyst (b) as defined above or below in claims.

The preferred article is a power cable, more preferably a LV, MV or HV cable, which comprises a conductor surrounded by at least one layer comprising, preferably consisting of, a polymer composition which comprises a polyolefin bearing hydrolysable silane groups (a) and a silanol condensation catalyst compound of formula (I) (b), as defined above or below.

The preferred power cable is selected from
a cable (A) comprising a conductor surrounded by at least an insulating layer comprising, preferably consisting of, a polymer composition which comprises a polyolefin (a) and a (b) catalyst compound of formula (I), as defined above or below in claims; or a cable (B) comprising a conductor surrounded by an inner semiconductive layer, an insulating layer and an outer semiconductive layer, wherein at least one layer, preferably at least the insulation layer, comprises, preferably consists of, the polymer composition which comprises a polyolefin (a) and a (b) catalyst compound of formula (I), as defined above or below in claims.

The cable (A) is preferably a LV or a MV cable. The cable (B) is preferably a MV cable or a HV cable.

In the embodiment of cable (B), the first and the second semiconductive compositions can be different or identical and comprise a polymer(s) which is preferably a polyolefin or a mixture of polyolefins and conductive filler, preferably carbon black. In case of cable (B), preferably, the insulating layer and, optionally and preferably, one or both, preferably both, of the inner semiconductive layer and the outer semiconductive layer comprise a polymer composition of the invention. In this case the polyolefin (a) and/or the (b) catalyst compound of formula (I) of the polymer compositions of the layers can be same or different.

The term "conductor" means herein above and below that the conductor comprises one or more wires. Moreover, the cable may comprise one or more such conductors. Preferably the conductor is an electrical conductor and comprises one or more metal wires.

In the preferred cable of the invention at least the insulation layer comprises the polymer composition.

Insulating layers for medium or high voltage power cables generally have a thickness of at least 2 mm, typically at least 2.3 mm, and the thickness increases with increasing voltage the cable is designed for.

As well known the cable can optionally comprise further layers, e.g. layers surrounding the insulation layer or, if present, the outer semiconductive layers, such as screen(s), a jacketing layer(s), other protective layer(s) or any combinations thereof.

The polymer composition of the invention is preferably crosslinked.

Accordingly, the polymer composition of the invention is preferably crosslinkable. "Crosslinkable" means that the polymer composition can be crosslinked using the (b) catalyst compound of formula (I) before the use in the end application thereof. Furthermore, the article, preferably the cable, of the invention is crosslinkable and crosslinked before the end use thereof.

Accordingly, the article which is preferably the cable of the invention is preferably crosslinkable. Preferably a crosslinked article is provided which comprises, preferably consists of, the polymer composition as defined above or in claims which is crosslinked in the presence of the catalyst (b) as defined above or in claims. More preferably a corsslinked cable, is provided, comprising a conductor surrounded by at least one layer, preferably at least an insulation layer, wherein at least said one layer, preferably at least an insulation layer, comprises, preferably consists of, the polymer composition as defined above or in claims which is crosslinked in the presence of the catalyst (b) as defined above or in claims. The crosslinked cable is novel as such, since the layer of the polymer composition contains the residues of the catalyst (b).

The invention further provides a process for producing an article comprising a step of forming an article using the polymer composition as defined above or below.

The preferred process is a process for producing a cable of the invention as defined above, whereby the process comprises the step of applying on a conductor, preferably by (co)extrusion, one or more layers, wherein at least one layer comprises, preferably consists of, the polymer composition which comprises (a) a polyolefin bearing hydrolysable silane groups and
(b) a silanol condensation catalyst compound of formula (I), as defined above or below in claims.

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer. (Co) extrusion can be effected in any conventional cable extruder, e.g. a single or twin screw extruder.

As well known a meltmix of the polymer composition or component thereof, is applied to form a layer. Meltmixing means mixing above the melting point of at least the major polymer component(s) of the obtained mixture and is carried out for example, without limiting to, in a temperature of at least 15° C. above the melting or softening point of polymer component(s). The meltmixing can be carried out in the cable extruder or in the mixer, e.g. kneader, preceding the extruder, or in both.

The more preferable cable process produces:
(i) a cable (A), wherein the process comprises the steps of
   applying on a conductor, preferably by (co)extrusion, at least an insulation layer comprising, preferably consisting of, a polymer composition which comprises a polyolefin (a) and a (b) catalyst compound of formula (I), as defined above or below in claims, or
(ii) a cable (B), wherein the process comprises the steps of
   applying on a conductor, preferably by (co)extrusion, an inner semiconductive layer comprising a first semiconductive composition, an insulation layer comprising an insulation composition and an outer semiconductive layer comprising a second semiconductive composition, in that order, wherein the composition of at least one layer, preferably at least the insulation composition of the insulation layer comprises, preferably consists of, a polymer composition which comprises
   a polyolefin (a) and a (b) catalyst compound of formula (I), as defined above or below in claims.

In this embodiment of cable (B), the first and the second semiconductive compositions can be different or identical and comprise a polymer(s) which is preferably a polyolefin or a mixture of polyolefins and conductive filler, preferably carbon black.

As well known, the polymer composition of the layer(s) of the cable can be produced before or during the cable production process. Moreover the polymer composition(s) of the layer(s) can each independently comprise part or all of the components of the final composition, before introducing to the (melt)mixing step a) of the cable production process. Then any remaining component(s) are introduced during or after cable formation.

In the preferred cable at least the insulation layer comprises, preferably consists of, the polymer composition. In this embodiment the polyolefin (a) and the compound of formula (I) of the polymer composition are combined according to the first embodiment of the preparation process of the polymer composition as described above, i.e. before the polymer composition is introduced, preferably in pellet form, to the cable production line.

In case one or two of the semiconductive layers of cable (B) comprise, preferably consist of, the polymer composition, then the polymer composition is preferably prepared according to the second embodiment of the preparation process of the polymer composition as described above, i.e. after the layer formation using polyolefin (a). Then the (b) catalyst compound of formula (I) can migrate from an adjacent layer, typically insulation layer, to the formed semiconductive layer.

The article production process of the invention comprises preferably a further step of crosslinking the produced article. According to a preferred embodiment of said process a crosslinked cable is produced, wherein the process comprises a further step of crosslinking the obtained at least one layer comprising a polymer composition as defined above or below in claims. The crosslinking is carried out in the presence of the (b) catalyst compound of formula (I) and water, also called as moisture curing. Water can be in form of a liquid or vapour, or a combination thereof. The silane groups present in the polyolefin (a) are hydrolysed under the influence of water in the presence of the present (b) silanol condensation catalyst compound of formula (I) resulting in the splitting off of alcohol and the formation of silanol groups, which are then crosslinked in a subsequent condensation reaction wherein water is split off and Si—O—Si links are formed between other hydrolysed silane groups present in said polyolefin (a). The crosslinked polymer composition has a typical network, i.a. interpolymer crosslinks (bridges), as well known in the field. Usually, moisture curing is performed in ambient conditions or in a so called sauna or water bath at temperatures of 70 to 100° C.

Moreover, the cable production process preferably comprises a further step of
(i) crosslinking the insulation composition of the insulation layer of the cable (A) in the presence of a (b) catalyst compound of formula (I) as defined above or below in claims and water, or
(ii) crosslinking at least one of the insulation composition of the insulation layer, the first semiconductive composition of the inner semiconductive layer or the second semiconductive composition of the outer semiconductive layer of the cable (B),
   preferably crosslinking at least the insulation composition of the insulation layer,
   more preferably crosslinking the insulation composition of the insulation layer and at least one of the first semiconductive composition of the inner semiconductive layer and the second semiconductive composition of the outer semiconductive layer,
   more preferably crosslinking the insulation composition of the insulation layer, the first semiconductive composition of the inner semiconductive layer, and, optionally, and preferably, the second semiconductive composition of the outer semiconductive layer,
   in the presence of a (b) catalyst compound of formula (I) as defined above or below and water.

In case of cable (B), the outer semiconductive layer can be bonded (non-strippable) or strippable, which terms have a well known meaning. The bonded outer semiconductive layer is typically crosslinked. The strippable outer semiconductive layer is typically not crosslinked.

Accordingly, in case of cable (B), preferably, the inner semiconductive layer, the insulating layer and optionally the outer semiconductive layer, depending whether bonded or strippable, are crosslinked.

A crosslinked cable obtainable by the process is also provided.

Furthermore, the invention provides a use of a (b) catalyst compound of formula (I) as defined above or below for crosslinking a polyolefin (a) as defined above or below, more preferably for crosslinking at least one layer of a cable comprising the polyolefin (a) as defined above or below.

Determination Methods

Wt %: % by weight

Total amount means weight, if in %, then 100 wt %. E.g. the total amount (100 wt %) of the polymer composition.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg (MFR$_2$) or 21.6 kg (MFR$_{21}$).

Density

Low density polyethylene (LDPE): The density was measured according to ISO 1183-2. The sample preparation was executed according to ISO 1872-2 Table 3 Q (compression moulding).

Low process polyethylene: Density of the polymer was measured according to ISO 1183/1872-2B.

Gel Content

Tape samples as prepared below in experimental part under "Tape sample preparation" were used to determine the gel content according to ASTM D 2765-01, Method B, using decaline extraction, with the following two deviations from this standard:

1) An addition extraction for 1 hour with new decaline was done in order to secure that all solubles were extracted.
2) Only 0.05% antioxidant (Irganox 1076) was added to the decalin instead of 1% as specified in the standard.

The gel content was then calculated according to said ASTM D 2765-01.

Hot Set Elongation Test

Tape samples as prepared below in experimental part under "Tape sample preparation" were used to determine the hot set properties. Three dumb-bells sample, taken out along extrusion direction were prepared according to ISO527 5A from the 1.7+−0.1 mm thick crosslinked tape. The hot set test were made according to EN60811-2-1 (hot set test) by measuring the thermal deformation.

Reference lines, were marked 20 mm apart on the dumb-bells. Each test sample was fixed vertically from upper end thereof in the oven and the load of 0.1 MPa are attached to the lower end of each test sample. After 15 min, 200° C. in oven the distance between the pre-marked lines were measured and the percentage hot set elongation calculated, elongation %. For permanent set %, the tensile force (weight) was removed from the test samples and after recovered in 200° C. for 5 minutes and then let to cool in room temperature to ambient temperature. The permanent set % was calculated from the distance between the marked lines The average of the three test were reported.

Content (Wt % and Mol %) of Polar Comonomer:

Comonomer content (wt %) of the polar comonomer was determined in a known manner based on Fourier transform infrared spectroscopy (FTIR) determination calibrated with $^{13}$C-NMR as described in Haslam J, Willis H A, Squirrel D C. Identification and analysis of plastics, 2$^{nd}$ ed. London Iliffe books; 1972. FTIR instrument was a Perkin Elmer 2000, 1 scann, resolution 4 cm$^{-1}$.

For determination of the comonomers, films with thickness 0.1 mm were prepared. The peak for the used comonomer was compared to the peak of polyethylene as evident for a skilled person (e.g. the peak for butyl acrylate at 3450 cm$^{-1}$ was compared to the peak of polyethylene at 2020 cm$^{-1}$). The weight-% was converted to mol-% by calculation based on the total moles of polymerisable monomers.

Content (Mol-%) of Hydrolysable Silane Group(s) (Si(Y)$_{3-q}$) Using X-Ray Fluorescence Analysis:

The pellet sample was pressed to a 3 mm thick plaque (150° C. for 2 minutes, under pressure of 5 bar and cooled to room temperature). Si-atom content was analysed by wavelength dispersive XRF (AXS S4 Pioneer Sequential X-ray Spectrometer supplied by Bruker). The pellet sample was pressed to a 3 mm thick plaque (150° C. for 2 minutes, under pressure of 5 bar and cooled to room temperature).

Generally, in XRF-method, the sample is irradiated by electromagnetic waves with wavelengths 0.01-10 nm. The elements present in the sample will then emit fluorescent X-ray radiation with discrete energies that are characteristic for each element. By measuring the intensities of the emitted energies, quantitative analysis can be performed. The quantitative methods are calibrated with compounds with known concentrations of the element of interest e.g. prepared in a Brabender compounder.

The XRF results show the total content (wt %) of Si and are then calculated and expressed herein as Mol %-Content of hydrolysable silane group(s) (Si(Y)$_{3-q}$).

EXPERIMENTAL PART

Preparation of Examples

Base Polyolefin (a)

Polyolefin I:

Commercially available copolymer of ethylene with vinyl trimethoxy silane (VTMS) comonomer, LE4423, supplier Borealis, VTMS content of the copolymer of 1.35 wt % (0.26 mol %), MFR of 1.0 g/10 min (190° C./2.16 kg) and density of 923 kg/m3, produced the high pressure polymerisation, in a tubular reactor.

Reference Master Batch:

Commercially available master batch of silane condensation catalyst LE4476, wherein the active catalyst component is based on sulfonic acid, supplied by Borealis.

Inventive Master Batches:

Inventive catalyst 1: Titanium diisopropoxide bis(2,4-pentanedionate) CAS-nr: 17927-72-9, Supplied by DuPont

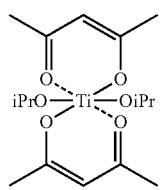

Inventive catalyst 2: Copper(II) acetylacetonate CAS-nr: 13395-16-9, Supplied by Sigma-Aldrich

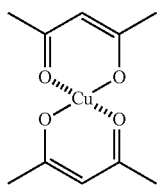

Inventive catalyst 3: Zinc acetylacetonate CAS-nr: 108503-47-5, Supplied by Sigma-Aldrich

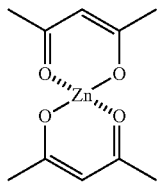

Inventive Master Batch Preparation:

Three test master batches were prepared. Inventive master batch 1 and inventive master batch 2 were prepared by compounding the inventive catalyst 1 and, respectively, the inventive catalyst 2 with the same conventional ethylene butyl acrylate copolymer (butyl acrylate, BA, content 17 wt %) as used for the reference MB. The obtained inventive master batch 1 contained 1.9 wt % of the inventive catalyst 1 and the obtained inventive master batch 2 contained 1.2 wt % of the inventive catalyst 2.

Tape Sample Preparation:

Tape samples were prepared by conventional compounding, i.e. meltmixing, polyolefin I together with the inventive master batch 1, the inventive master batch 2 or, respectively, the reference master batch in a tape extruder (Collin Teach-Line Extruder, Type: E 20 T SCD 15, settings disclosed in table 2), and in amounts to obtain a test polymer composition containing 2.3 mmol/kg of the catalyst or 6.9 mmol/kg of the catalyst as given in the below tables.

TABLE 2

| Compounding conditions | | | | | | | |
|---|---|---|---|---|---|---|---|
| Set Values Temperature [° C.] | | | | | | Extruder | |
| Zon 1 | Zon 2 | Zon 3 | Zon 4 | Zon 5 | Zon 6 | Speed [rpm] | Output [kg/h] |
| 60 | 150 | 160 | 170 | 170 | 170 | 30 | 0.8 |

The obtained tape samples (with 1.8±0.1 mm in thickness) were used for crosslinking and for determining gel content and hot set.

Crosslinking was effected by keeping the obtained tape sample in water bath at 90° C. as specified in the below tables. Hot set elongation was measured after crosslinking 24 h in water bath at 90° C.

The components and their amounts of the inventive and reference compositions, the crosslinking conditions and period, as well as the results of the measurements are given in table 3 and 4.

TABLE 3

Catalytic effect of the Inventive composition 1 and 2 compared to Reference composition 1

| | Gel content 24 h[1,] |
|---|---|
| Inv. Comp. 1 (2,3 mmol/kg of Inventive catalyst 1 in Polyolefin I) | 43 |
| Inv. Comp. 2 (2,3 mmol/kg of Inventive catalyst 2 in Polyolefin I) | 75 |
| Ref. Comp. 1(2,3 mmol/kg of ref. catalyst in Polyolefin I) | 78 |

[1,]Crosslinking in water bath at 90° C., for the specified time period.

TABLE 4

Catalytic effect of the Inventive composition 1 and 2 compared to Reference composition 1

| | Hot set 24 h[1,2] | Gel content 24 h[1,] |
|---|---|---|
| Inv. Comp. 1 (6,9 mmol/kg of Inventive catalyst 1 in Polyolefin I) | 292 | 50 |
| Inv. Comp. 2 (6,9 mmol/kg of Inventive catalyst 2 in Polyolefin I) | 47 | 77 |
| Ref. Comp. 1(2,3 mmol/kg of ref. catalyst in Polyolefin I) | 34 | 78 |

[1,]Crosslinking in water bath at 90° C., for the specified time period.
[2,]Hot Set measured is Hot Set Elongation

The invention claimed is:

1. A cable comprising a conductor surrounded by an inner semiconductive layer, an insulating layer, and an outer semiconductive layer, wherein at least the insulation layer comprises a polymer composition which comprises:

(a) a polyolefin comprising a LDPE bearing hydrolysable silane groups of density 900 to 945 kg/m$^3$ which is a homopolymer with silane groups which are introduced by grafting a silane group(s) containing compound to the LDPE;

wherein the silane group(s) containing compound for grafting silane groups to produce LDPE (a) is a compound of formula (IIc), $$CH_2=CH-(CH_2)_t-Si(OA)_3 \qquad (IIc),$$

wherein t=0 to 6; and

A is a hydrocarbyl group, formyl group or acetyl group; and (b) a silanol condensation catalyst compound of formula (I):

$$Me^{+n}(OCR^1=CR^2-(C=O)R^3)_m R^4_s \qquad (Ic),$$

wherein Me is Ti, Zr, Hf, Cu or Zn;

n is 2 or 4;

m is 2; s is 0 or 2; m+s=n;

each $R^1$ is a linear or branched $(C_1-C_6)$alkyl group;

each $R^3$ is a linear or branched $(C_1-C_6)$alkyl group;

each $R^4$ independently is $OR^{1'''}$; and $R^{1'''}$ is a linear or branched $(C_1-C_6)$alkyl group;

wherein the polymer composition comprises hydrolysable silane groups in an amount of from 0.001 to 12 mol % based on the total amount of the polyolefin.

2. The cable as claimed in claim 1 wherein the silanol condensation catalyst compound is

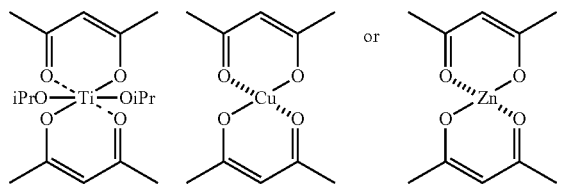

3. The cable according to claim 1 wherein in the polymer composition the (b) silanol condensation catalyst compound of formula (I) is present in an amount of 0.0001 to 6.0 wt % based on the combined amount of the LDPE bearing hydrolysable silane groups (a) and the silanol condensation catalyst compound (b).

4. The cable according to claim 1 wherein the polymer composition comprises hydrolysable silane groups in an amount of from 0.01 to 4 mol % grafted silane groups based on the total amount of the polyolefin.

5. The cable as claimed in claim 1 wherein the cable is a power cable.

6. A process for producing a cable comprising a conductor surrounded by at least one layer, comprising co-extruding on the conductor one or more layers, wherein at least one layer comprises polymer composition which comprises:
(a) a polyolefin comprising a LDPE bearing hydrolysable silane groups of density 900 to 945 kg/m³ which is a homopolymer with silane groups which are introduced by grafting a silane group(s) containing compound to the LDPE;

wherein the silane group(s) containing compound for grafting silane groups to produce LDPE (a) is a compound of formula (IIc), $$CH_2=CH-(CH_2)_t-Si(OA)_3 \quad \text{(IIc)},$$

wherein t=0 to 6; and
A is a hydrocarbyl group, formyl group or acetyl group; and
(b) a silanol condensation catalyst compound of formula (I):

$$Me^{+n}(OCR^1=CR^2-(C=O)R^3)_m R^4_s \quad \text{(Ic)},$$

wherein Me is Ti, Zr, Hf, Cu or Zn;
n is 2 or 4;
m is 2; s is 0 or 2; m+s=n;
each $R^1$ is a linear or branched ($C_1$-$C_6$)alkyl group;
each $R^3$ is a linear or branched ($C_1$-$C_6$)alkyl group;
each $R^4$ independently is $OR^{1'''}$; and
$R^{1'''}$ is a linear or branched ($C_1$-$C_6$)alkyl group;
wherein the polymer composition comprises hydrolysable silane groups in an amount of from 0.001 to 12 mol % based on the total amount of the polyolefin.

7. The process as claimed in claim 6 wherein the cable is a power cable
wherein the at least one layer comprises at least an insulating layer comprising the polymer composition, or
wherein the at least one layer comprises an inner semiconductive layer, an insulating layer and an outer semiconductive layer, wherein at least one of the inner semiconductive layer, the insulating layer, and the outer semiconductive layer comprises the polymer composition.

8. The process according to claim 6 further comprising crosslinking the at least one layer comprising the polymer composition in presence of water.

* * * * *